(12) United States Patent
Bhaskaran et al.

(10) Patent No.: US 12,480,990 B2
(45) Date of Patent: Nov. 25, 2025

(54) TECHNIQUE FOR ENABLING ON-DIE NOISE MEASUREMENT DURING ATE TESTING AND IST

(71) Applicant: NVIDIA CORPORATION, Santa Clara, CA (US)

(72) Inventors: Bonita Bhaskaran, Santa Clara, CA (US); Nithin Valentine, Santa Clara, CA (US); Shantanu Sarangi, Santa Clara, CA (US); Mahmut Yilmaz, Santa Clara, CA (US); Suhas Satheesh, Santa Clara, CA (US); Charlie Hwang, Santa Clara, CA (US); Tezaswi Raja, Santa Clara, CA (US); Kevin Zhou, Santa Clara, CA (US); Sailendra Chadalavada, Santa Clara, CA (US); Kevin Ye, Santa Clara, CA (US); Seyed Nima Mozaffari Mojaveri, Santa Clara, CA (US); Kerwin Fu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 430 days.

(21) Appl. No.: 17/979,246

(22) Filed: Nov. 2, 2022

(65) Prior Publication Data
US 2023/0146920 A1 May 11, 2023

Related U.S. Application Data

(60) Provisional application No. 63/276,864, filed on Nov. 8, 2021.

(51) Int. Cl.
*G01R 31/317* (2006.01)
*G01R 29/26* (2006.01)
(Continued)

(52) U.S. Cl.
CPC ....... *G01R 31/31708* (2013.01); *G01R 29/26* (2013.01); *G01R 31/31725* (2013.01);
(Continued)

(58) Field of Classification Search
CPC ........ G01R 31/31708; G01R 31/31725; G01R 31/31727; G01R 31/3177; G01R 31/31905; G01R 29/26
See application file for complete search history.

(56) References Cited

U.S. PATENT DOCUMENTS 8,203,368 B2 * 6/2012 Pelgrom .......... G01R 31/31709
327/156
8,726,108 B2 * 5/2014 Tekumalla ..... G01R 31/318558
714/740

(Continued)

OTHER PUBLICATIONS

Stellari et al., "On-chip Power Supply Noise Measurement using Time Resolved Emission (TRE) Waveforms of Light Emission from Off-State Leakage Current (LEOSLC)", 2009, IEEE Publication, pp. 1-10 (Year: 2009).*

(Continued)

*Primary Examiner* — Elias Desta

(57) ABSTRACT

Introduced herein is a technique that reliably measures on-die noise of logic in a chip. The introduced technique places a noise measurement system in partitions of the chip that are expected to cause the most noise. The introduced technique utilizes a continuous free-running clock that feeds functional frequency to the noise measurement circuit throughout the noise measurement scan test. This allows the noise measurement circuit to measure the voltage noise of the logic during a shift phase, which was not possible in the conventional noise measurement method. Also, by being able to measure the voltage noise during a shift phase and hence in both phases of the scan test, the introduced technique can perform a more comprehensive noise measure- (Continued)

ment not only during ATE testing but as part of IST in the field.

45 Claims, 10 Drawing Sheets

(51) Int. Cl.
*G01R 31/3177* (2006.01)
*G01R 31/319* (2006.01)
(52) U.S. Cl.
CPC ... *G01R 31/31727* (2013.01); *G01R 31/3177* (2013.01); *G01R 31/31905* (2013.01)

(56) References Cited

U.S. PATENT DOCUMENTS 9,838,165 B2 * 12/2017 Schuttert ................ H04L 1/242
2015/0008940 A1    1/2015 George et al.

OTHER PUBLICATIONS

Bhunia et al., "Low-Power Scan Design Using First-Level Supply Gating", Mar. 2005, IEEE Publication, vol. 13, No. 3, pp. 384-395 (Year: 2005).*

* cited by examiner

Clocking Scheme for enabling shift/capture noise measurements

TECHNIQUE FOR ENABLING ON-DIE NOISE MEASUREMENT DURING ATE TESTING AND IST

CROSS-REFERENCE TO RELATED APPLICATION

This application claims the benefit of U.S. Provisional Application Ser. No. 63/276,864, filed on Nov. 8, 2021, entitled "TECHNIQUE FOR ENABLING ON-DIE NOISE MEASUREMENT DURING ATE TESTING AND IST," commonly assigned with this application and incorporated herein by reference in its entirety.

TECHNICAL FIELD

This application is directed, in general, to design for testing (DFT) and, more specifically, to on-die noise measurement techniques for DFT.

BACKGROUND

DFT adds testability features to a hardware product design. The added features make it easier to develop and apply test patterns to the designed hardware, which can validate that the product hardware does not contain any defects that could adversely affect the product's proper functioning. Test patterns may be applied during hardware manufacturing and during system maintenance in the field. The tests are generally applied using automatic test equipment (ATE) and, in the case of system maintenance, as an in-system test (IST).

BRIEF DESCRIPTION

Reference is now made to the following descriptions taken in conjunction with the accompanying drawings, in which.

DETAILED DESCRIPTION

Figure 1:
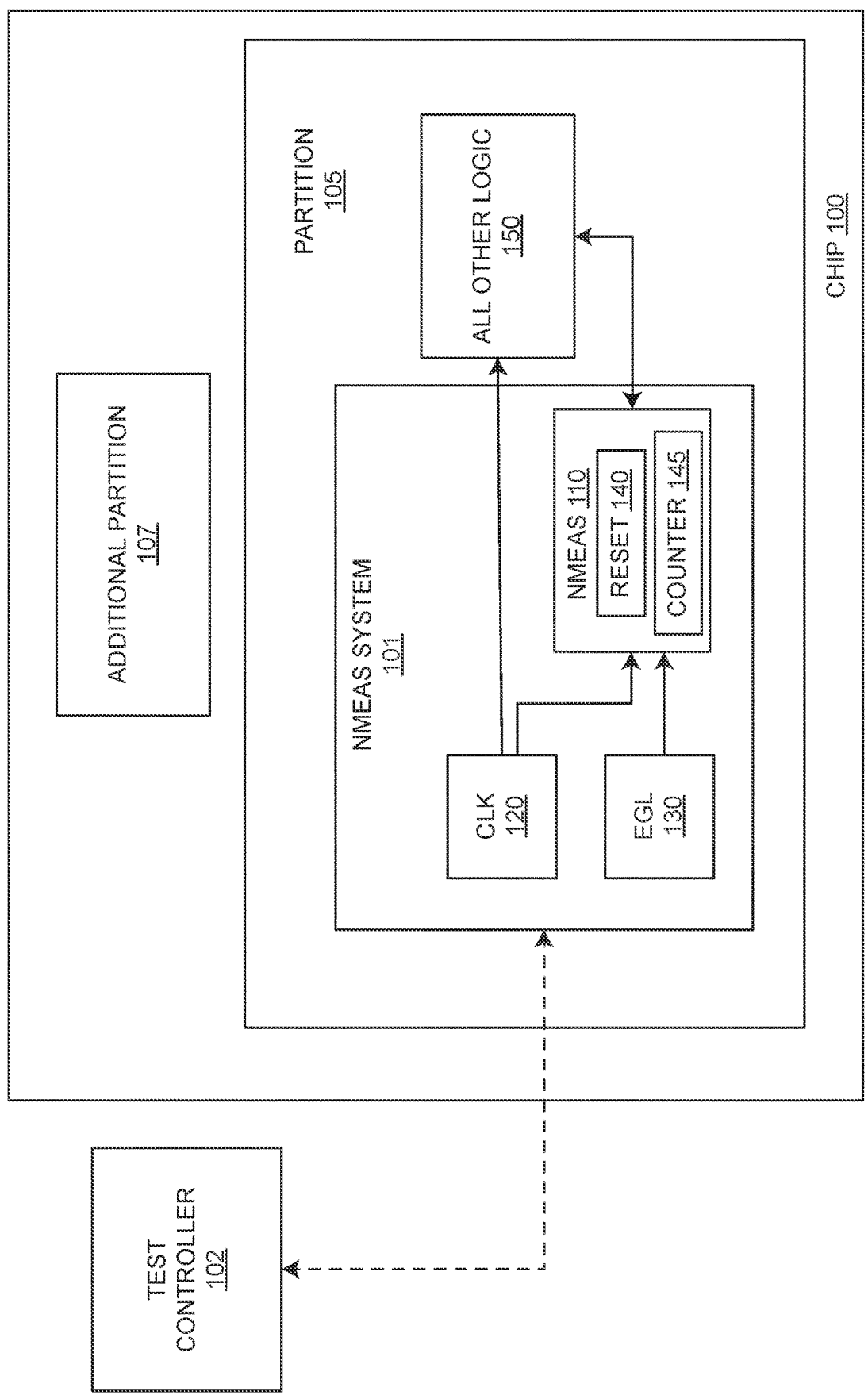
FIG. 1 illustrates a block diagram of an embodiment of a Noise Measurement (NMEAS) system.

In the case of modern chips, a large number of flops and combinational logic gates can be active simultaneously across the chip at functional clock frequency during ATE testing. Because the amount of simultaneous switching (toggling of the flops and combinational logic gates) can exceed functional budgets of the chips, low power scan architectures like Low Power Capture (LPC) and Shift Staggering that help lower the toggle rate during capture and shift phases, respectively, have been used. For capture phase, which uses functional clock frequency, it has always been a challenge to tune and optimize the low power settings of the LPC to ensure that voltage noise is within functional sign-off budgets. For shift phase, a slow clock, i.e., slower than the functional clock, is used. While the voltage noise may not affect the block under the test during a shift phase, it can superimpose itself on a neighboring block, which could be in the capture phase of testing, increase the operating voltage for the testing and cause timing violations for the test backbone.

A key to characterizing and optimizing these low power settings is to have a means to measure voltage noise since it is almost impossible to simulate all the corner cases adequately and add probe points in the chip at multiple locations for silicon measurement. As such, to reliably sign-off on production patterns and optimize low power settings of the low power scan architecture, on-die noise and slack measurement is needed for ATE testing. Additionally, dies go through system level testing (SLT) after ATE testing and any fallout at SLT can be expensive due to the accumulated cost of waste. To minimize this fallout at SLT, SLT to ATE correlation is beneficial to screen for defects at the ATE level.

With modern chips foraying into the automobile space, Functional Safety has gained utmost priority. IST enables testing a complex System on a chip (SOC) system, for logic and memory structural faults through Logic built-in self-test (BIST) and Memory BIST in the field, to improve safety and reliability. It is one of the means to provide coverage for hardware permanent faults towards meeting the ISO26262 ASIL-C requirements for chips such as Tegra and dGPU (discrete GPU) chips on the Pegasus platform of NVIDIA Corporation of Santa Clara, California. IST helps catch reliability and aging-related defects in the field that show up after stress and degradation and prevent them from causing catastrophic operational failures.

Characterization of IST patterns for voltage noise and Vmin is done on a few variations of Process, Voltage, Temperature and Frequencies and is not exhaustive. Traditionally, scan patterns are run on the ATE with a more test-optimized environment (better power integrity), while the system board environments have very stringent Latency & Thermal Design Power (TDP) requirements. IST voltage and frequency conditions are decided after volume data collection to optimize for both noise and power. The operating voltage for IST is determined by guard-banding on observed Vmin, which makes the margin very tight since higher the voltage, higher is the Thermal Design Power (TDP). Additional optimization of the patterns may also be needed to reduce simultaneous switching when noise is high for certain corner case PVT conditions. The simultaneous activity cannot be lowered aggressively since latency requirements need to be satisfied as well. Considering the compliance requirement of all these parameters, on-die noise and slack measurement provides the information needed for characterization and optimization of Vmin and also provides a means to monitor noise on chips in the field at the time of IST, such as automotive chips.

Another important application of on-die noise measurement is during runtime IST. During runtime IST, scan patterns are run on a core that is not in use when the chip is operational, as an additional functional safety mechanism on the CCPLEX (main CPU complex) on a SoC, such as Orin of NVIDIA. Here, the comprehensive Slack/Noise Detection mode is important because, if the noise exceeds functional sign-off criteria, it could potentially affect the functional operation of the system that includes the chip, such as an autonomous or semi-autonomous vehicle. This could also potentially happen due to—1) aging or 2) at a specific PVT, f which was not characterized earlier.

Today, voltage noise measurements are conducted at the system-level, using monitors (Sense monitors) on-die which are routed out on the board. Voltage noise measurements on these sense monitors typically drive all Vmin issues and noise experiments in both IST & ATE use cases. There is usually one measurement monitor for the entire rail and with the increasing size of chips, the sense lines are accurate only for measurement on the chiplet where they are placed. Since it is proving to be costly in terms of routing to add these in hot spots where power-hungry sub-chiplets like a streaming multiprocessor (SM) are located, the sense monitors are generally added on padlets or much quieter smaller chiplets, away from where the hotspots are located. This could give a false sense of compliance to noise budgets since global noise is attenuated purely as a function of distance from the sense measurement points on the layout. The sensor monitor measurements also do not provide a measure of the slack because the sense lines only measure the absolute peak to peak amplitude of the noise. As the measurements do not consider the noise on the clock path, it cannot determine the net effect of the noise on on-die logic.

Introduced herein is a technique that reliably measures on-die noise, which can help optimize low-power solutions better on a per-project basis. The introduced technique places a noise measurement system in partitions that are expected to cause the most noise. Partitions refer to smaller logic blocks in a chip under test. With this granular manner (per-partition) of noise measurement, the technique can measure noise that is not only closer to hotspots of the chip but more indicative of the flop-level noise, preventing the false sense of compliance from the sense monitor measurements.

Also, due to its granular manner of measurement, the introduced technique can relax the LPC settings at a per-partition level and optimize the low power settings more precisely. Currently, the LPC is set up for a stringent low power budget for production patterns to account for corner case conditions at a low over-all flop toggle rate. But at times, the Automatic Test Pattern Generation (ATPG) tool cannot even reach the maximum allowable toggle rate because the LPC controller places constraints on the ATPG tool. With the reliable measurements acquired using the introduced technique, the controller can be tuned for local droop within the partition as well as for global droop at the chiplet-level. When additional partitions exhibit a similar behavior, then the LPC settings can be selectively relaxed, resulting in a pattern count reduction. As such, using the introduced technique, the low-power solutions can be optimized, and the test time can be cut down, reducing the test cost per chip significantly.

The introduced technique utilizes a free-running clock that feeds functional frequency to the noise measurement circuit throughout the noise measurement scan test. This allows the noise measurement circuit to measure the voltage noise of the chip during a shift phase, which was not possible in the conventional noise measurement method. Also, by being able to measure the voltage noise during a shift phase and hence in both phases of the scan test, the introduced technique can perform a more comprehensive noise measurement not only during ATE testing but as part of IST in the field.

Furthermore, as the introduced technique makes noise measurements as a function of clock path, it can indicate the measurements' net effect on the logic in the chip, which was not indicatable from sensor measurements. For example, for a particular di/dt event, even if the clock network and the datapath slowed down exactly by the same time measure, sensor measurement would only indicate the effect on the data path. But the introduced technique's noise measurement would indicate the effect on both the data and clock path, illustrating that the net effect of that event is actually 0.

In addition to the free-running clock, the introduced technique utilizes a novel enable generation logic (EGL) and a counter that allow a precise characterization of the measured voltage noise data. The EGL distinguishes between different phases of the scan testing and record the noise measurement accordingly. The counter keeps track of patterns used in the testing so that the exact pattern that caused the worst noise can be easily identified. Lastly, the introduced technique uses a novel reset macro that allows the measurement circuit to scan test itself. By assuring a direct reset to the measurement system while bypassing the internal reset, the reset macro facilitates a self-test of the measurement system, which improves the reliability of the measurement system in the field.

FIG. 1 illustrates a block diagram of an example chip 100 having a Noise Measurement (NMEAS) system 101. The system 101 may be communicatively connected to a test controller 102, e.g., an ATE or an IST controller, that is configured to initiate DFT scan testing on the chip 100 using the system 101. The chip 100 includes multiple partitions and the system 101 may be located in one or more of the partitions. In the illustrated example, the system 101 is located in one of the partitions of the chip 100, the partition 105 that has been determined to dissipate the most heat and hence produce the most voltage noise. In addition to the system 101, the partition 105 includes other logic 150. A block representing other partitions of the chip 100 is denoted as additional partitions 107. The IST controller may be located on a same chip as the system 101, e.g., in one of the additional partitions 107, or external to the chip 100. The system 101 includes an NMEAS circuit 110, a clock circuit 120 and an Enable Generation Logic (EGL) 130. In the illustrated example, the system 101 is a part of an advanced driver-assistance system (ADAS), such as an autonomous vehicle control system, a semi-autonomous vehicle control system, or a technology assisted vehicle control system. The system 101 can also be used in other systems, including computer vision systems such as robotic systems.

The system 101 performs the DFT scan testing on the chip 100 using sets of DFT test patterns. In addition to the conventional DFT scan testing measurements such as structural fault detection, the system 101 also determines a slack of the logic 150 in the partition 105. The logic 150 refers to the other logic in the chip, i.e., logic other than the logic of the NMEAS circuit. Based on the measured voltage noise from the NMEAS circuit 110 and the clock signal from the clock circuit 120, the system 101 determines the slack of the logic 150 during a shift phase, a capture phase, and a comprehensive phase, which includes both the shift and capture phases. The system 101 can be used during ATE testing of the chip or during IST in the field.

In the illustrated example, the NMEAS circuit 110 is communicatively connected to the clock circuit 120, the EGL 130 and the logic 150. During operation, the NMEAS circuit 110 receives a clock signal and a control signal from the clock circuit 120 and the EGL 130, respectively, and measures the voltage noise of the logic 150.

The clock circuit 120 provides a clock signal to the NMEAS circuit 110 and the logic 150. Based on the testing mode the NMEAS system 101 is in, the clock circuit 120 may feed different clock signals to the NMEAS circuit 110 and the logic 150. During the noise measurement mode (when the voltage noise of the logic is measured), the clock circuit 120 provides functional frequency clock, i.e., free-running clock that is within an operating frequency range of the NMEAS circuit 110, to the NMEAS circuit 110 irrespective of a phase, e.g., a shift or capture phase, while providing shift and capture frequency clock to the logic 150 depending on the phase, e.g., a shift clock portion followed by a capture clock portion is repeated for each pattern. During the self-testing mode when the structural faults of the NMEAS circuit 110 are detected, the clock circuit 120 provides the shift and capture clock to the NMEAS circuit 110. It is understood that the functional frequency clock and the capture portion of the shift and capture frequency clock are considered faster than the shift portion of the shift and capture frequency clock as they have a higher frequency than the shift portion. In other words, the shift portion is outside of the frequency rage of the NMEAS circuit 110.

The EGL 130 asserts a control bit signal to the NMEAS circuit 110 for recording noise measurement. The EGL 130 distinguishes between different phases and asserts the control bit signal during phases corresponding to the trim mode. The reset macro 140 within the NMEAS circuit 110 allows the NMEAS circuit 110 to be placed in the self-testing mode. Under the self-testing mode, the NMEAS circuit 110 performs a conventional DFT scan test detecting structural faults of the NMEAS circuit 110.

A counter 145 is located within the NMEAS circuit 110. The counter tracks a pattern number so that a pattern with the worst noise, i.e., with the highest voltage overshoot and/or lowest undershoot, can be determined for noise characterization and Vmin search.

Figure 2:
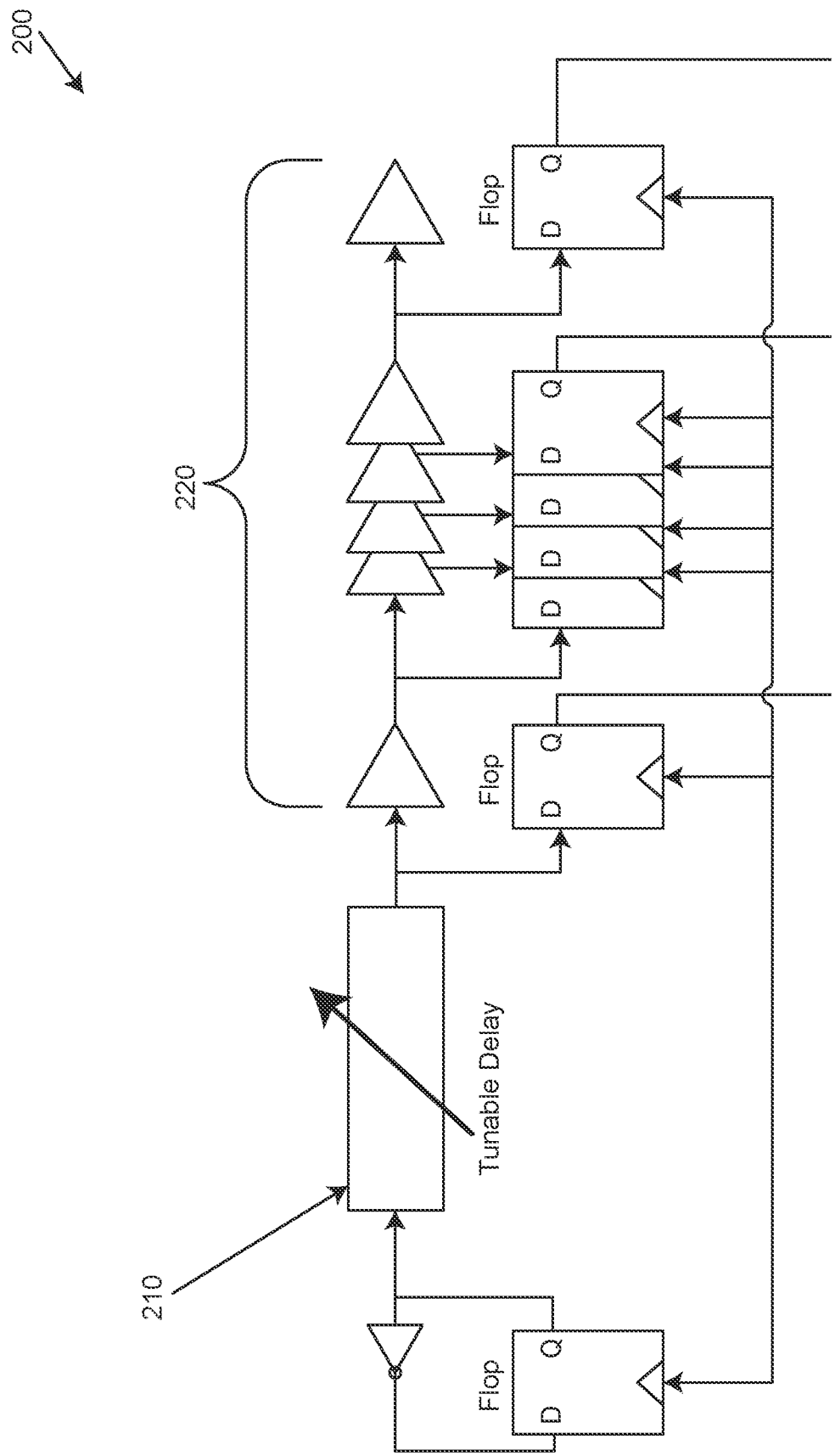
FIG. 2 illustrates a block diagram of an embodiment of an NMEAS circuit.

FIG. 2 illustrates a block diagram of an example NMEAS circuit 200 such as NMEAS circuit 110 in FIG. 1. The NMEAS circuit 200 is a noise measurement block that sends clock as data through a programmable delay and captures the data at successive intervals to evaluate the number of "pass" and "fail" corresponding to the programmable delay. The NMEAS circuit 200 operates on the principle that the delay of a signal through combinational logic is affected by the supply voltage. If the supply voltage fluctuates, the delay through the timing path is affected and can cause failures. The concept of the NMEAS circuit 200 is to mimic a flop-to-flop path but have programmable delay in the data path to fill the entire clock cycle so that the capture flop will indicate pass or fail. A single flop can only indicate pass or fail, but with multiple capture flops separated by fine delays, how much the path has failed can be indicated.

The programmable delay includes the tunable delay (TRIMs) 210 and a series of fine delay elements (TAPs) 220 that separates each of the capture flops. The TAPs 220 produces a thermometer code output of how many flops pass and how many flops failed, which represents the delay through the TRIMs 210. The idea for noise measurement is that at every cycle an edge is sent from the launch flop and on the next cycle, the NMEAS circuit 200 samples the edge in the TAPs 220 and determines how many TAPs 220 successfully captured the edge (pass) and how many TAPs 220 missed the edge. As the edge is travelling through the TRIMs 210 during the cycle time, noise would affect the delay in the TRIMs 210 causing the number of TAPs 220 successfully capturing the edge to change. The NMEAS circuit 200 compares the output of the TAPs 220 on every cycle to a base line measurement (when noise is not present) to determine the changes in TAPs 220 caused by the noise. In the illustrated example, the NMEAS circuit 200 is a time to digital converter (TDC).

Although not illustrated in FIG. 2, the NMEAS circuit 200 includes a counter for pattern tracking, such as counter 145 of FIG. 1. The counter keeps track of the exact pattern that caused worst-case noise during the test. This is done by keeping count of the rising edges of control signal, e.g., DFT_CONTROL bit, which is asserted when noise measurement is recorded. Whenever max tap or min tap is encountered, counter snapshot is preserved to help with debugging and analysis. In one embodiment, a 64-bit counter is added to provide additional ways to understand which exact pattern has the highest and lowest noise measured during any of the phases of the test.

The key challenge for using the NMEAS circuit 200 as a functional unit during scan testing is that it needs a functional or at-speed clock frequency throughout the scan testing. While capture phases of scan test run at functional frequencies of the NMEAS circuit 200, shift phases typically run at frequencies of 50-70 MHz, which is lower than the functional frequencies. The noise measurement block needs to be functional during both phases to measure noise during both phases. It is not practical to feed the NMEAS circuit 200 with the shift frequency clock during scan shift noise measurement since the resolution of the measurement would be lost due to averaging over the longer time period of the shift frequency clock and the frequency of the shift frequency clock would also be out of the operating range of the NMEAS circuit 200.

Figure 3:
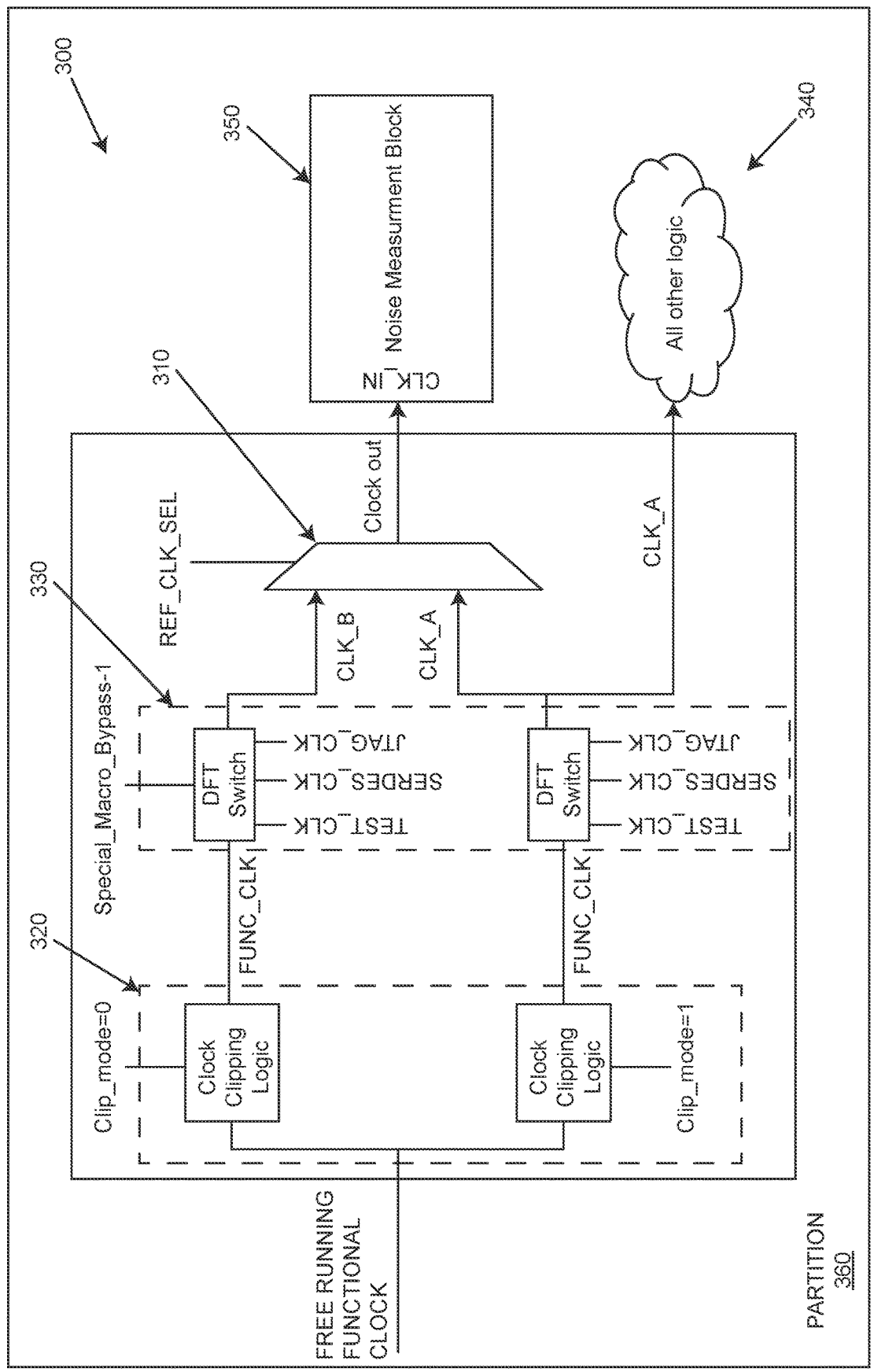
FIG. 3 illustrates a block diagram of an embodiment of a clock circuit.

FIG. 3 illustrates a diagram of an example clock 300 that keeps an NMEAS circuit 350, such as NMEAS circuit 200 in FIG. 2, functional at the time of noise measurements during scan testing. The clock 300 is able to provide the functional frequency clock to the NMEAS circuit 350 while providing the shift and capture frequency clock to the other logic in the chip under a measurement mode, i.e., when a DUT is the other logic in the chip, and is also able to provide the shift and capture frequency clock to the NMEAS circuit 350 under a self-testing mode, i.e., when the DUT is the NMEAS circuit 350. In the illustrated example, the clock 300 is located in a same partition 360 with the NMEAS circuit 350, and includes 2-input mux 310 and a pair of clock clipping logics (CCL) 320 and DFT switches 330 along each clock path, CLK_A and CLK_B. The partition 360 can correspond to, for example, the partition 105 in FIG. 1.

In the illustrated example, the input mux 310 chooses between the functional frequency clock and the shift and capture frequency clock from the DFT switches 330. The output of the mux 310 feeds the NMEAS circuit 350 to switch between a measurement mode and a self-testing mode. When the NMEAS circuit 350 is in the measurement mode, the NMEAS circuit 350 measures the voltage noise of other logic 340 in the partition, and when the NMEAS circuit 350 is in the self-testing mode, the NMEAS circuit 350 detects whether it has any structural faults.

While the CCL 320 clips CLK_A provided to the DUT during capture phases, the CCL 320 does not clip CLK-A during shift phases. Clipping introduces 1 pulse for testing stuck-at faults and 2 pulses for testing transient faults. CLK_B is programmed to run at the functional frequency irrespective of the phase, even during shift phase. CLK_A on the other hand is programmed to run at the shift frequency during shift phase.

By connecting CLK_B to NMEAS CLK_IN pin of the NMEAS circuit 350, noise measurement is possible in both shift and capture phases. Although not illustrated, a soft wrapper that houses the NMEAS circuit 350 can also house the 2-input mux 310 whose output is connected to CLK_IN port of the NMEAS circuit 350. The DFT 330 may not be available on all partitions. For example, DFT 330 or similar functional circuitry may only be available in SM partitions of some processors, such as NVIDIA's GA100 GPU or a newer processor of NVIDIA.

Figure 4:
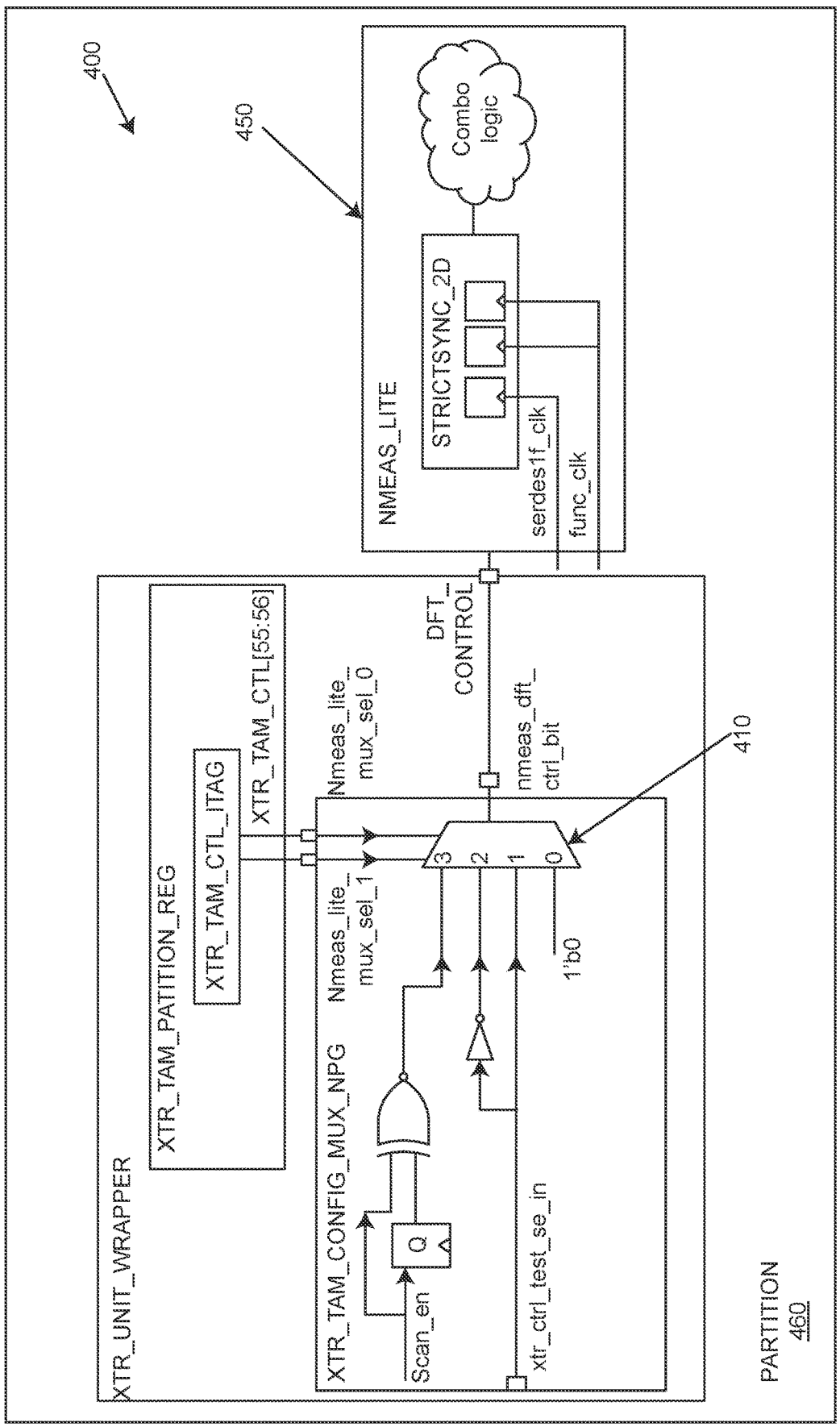
FIG. 4 illustrates a block diagram of an embodiment of Enable Generation Logic.

FIG. 4 illustrates a diagram of an example EGL 400, such as EGL 130 in FIG. 1. The EGL 400 asserts DFT_CONTROL bit to an NMEAS circuit 450, such as 110 in FIG. 1 or 200 in FIG. 2, whenever noise measurement needs to be recorded. In the illustrated example, the EGL 400 is located in a same partition 460 as the NMEAS circuit 450. The partition 460 can correspond to, for example, the partition 105 in FIG. 1.

The noise tracking within the NMEAS circuit 450 gets reset only upon the rising edge of DFT_CONTROL bit which is connected to the NOISE_ENABLE. In the illustrated example, the EGL 400 uses the Scan Enable to distinguish between different phases, which is used to generate three inputs of a 4-input mux 410. As seen below in Table 1, Mode 3 (11) enables the DFT_CONTROL bit to be enabled across all patterns in the FTM pattern set, thus being a comprehensive mode of measurement. Mode 2 (10) enables the bit to only be set during capture phases for every pattern while Mode 1 (01) enables it to be set during shift phases only. Mode 0 (00) is unused. In all these scenarios, the NMEAS circuit 450 is still outputting tap point once every clock cycle.

TABLE 1

| NMEAS_mux_sel_0/1 | Trim mode |
| --- | --- |
| 00 | No measurement |
| 01 | Shift only |
| 10 | Capture only |
| 11 | Comprehensive (shift and capture) |

Figure 5:
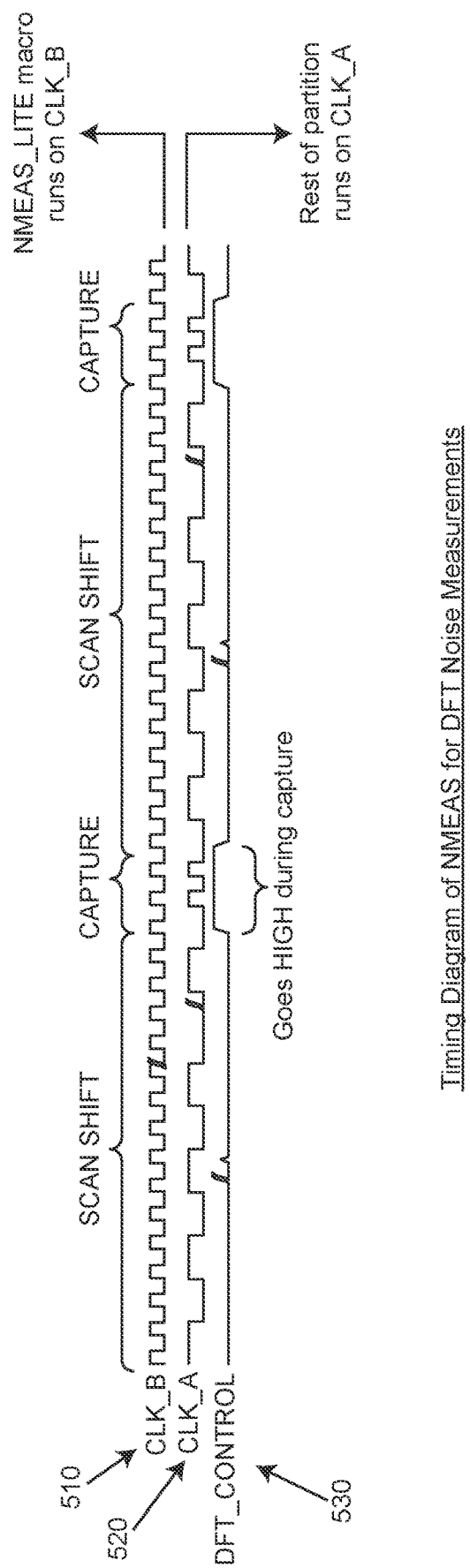
FIG. 5 illustrates a timing diagram of an NMEAS circuit for voltage noise measurements during capture phases.

FIG. 5 illustrates a timing diagram of an example NMEAS circuit, such as 350 in FIG. 3 or 450 in FIG. 5, under the noise measurement mode for voltage noise measurements during capture phases. CLK_B 510 represents the functional frequency clock signal, which is fed to the NMEAS circuit, and CLK_A 520 represents the shift and capture frequency clock signal that includes shift and capture clock portions and is fed to the other logic in the partition. DFT_CONTROL 530 represents the signal that enables the NMEAS circuit to record the noise measurement. In the illustrated example, the DFT_CONTROL 530 is asserted only during captures phases to record the noise measurements.

Figure 6:
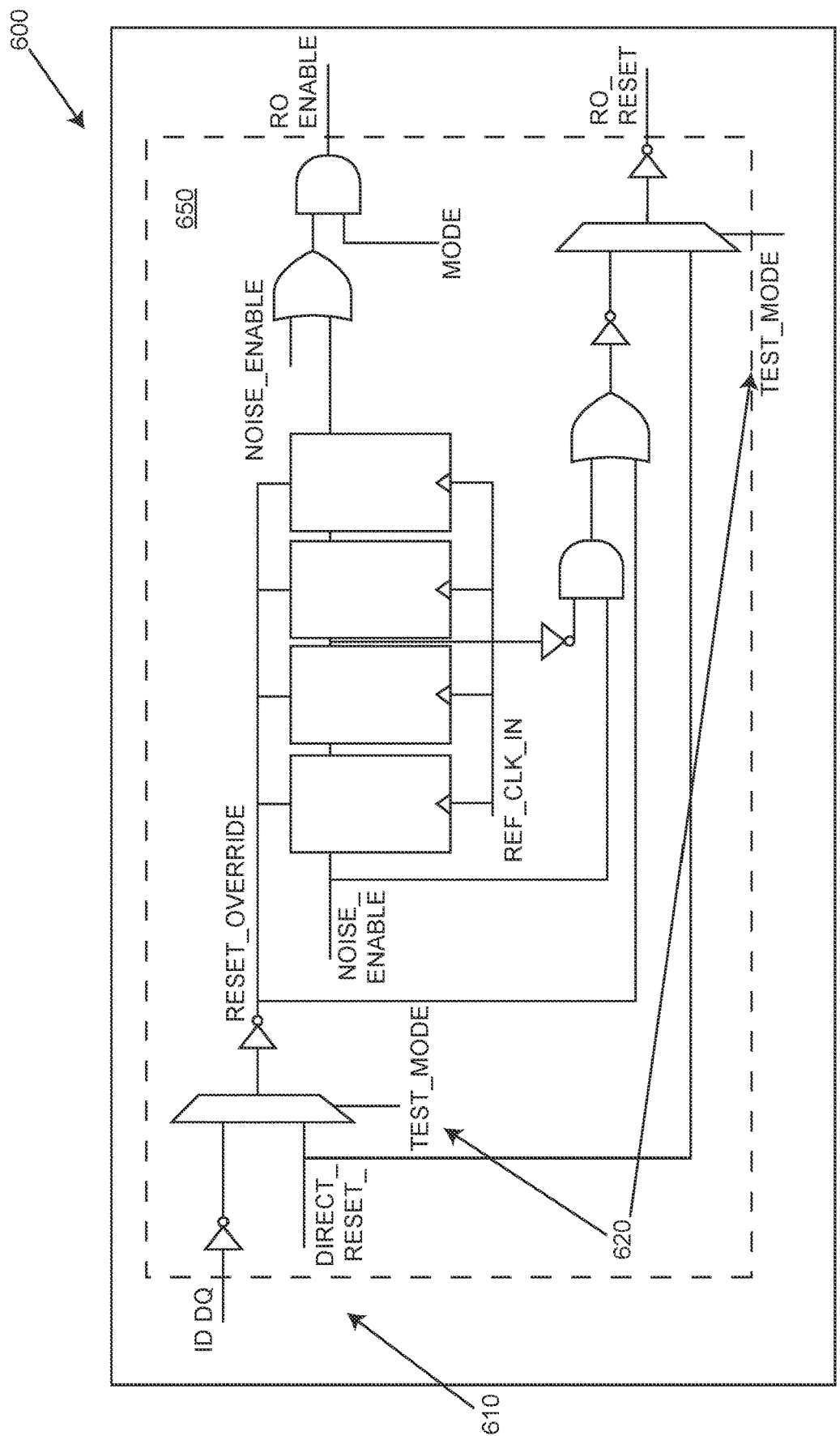
FIG. 6 illustrates a block diagram of an embodiment of a RESET macro.

FIG. 6 illustrates a diagram of a RESET macro 600, such as 140 in FIG. 1. The macro 600 is located within an NMEAS circuit and enables a scan test to be performed on the NMEAS circuit. The macro 600 may be switched to a measurement mode, which performs the scan test on the other logic in the partition, to a self-testing mode based on an external signal. When in the self-testing mode, i.e., when in test mode signal TEST_MODE 620 is asserted, the internally generated reset of the macro 600 is overridden by direct reset signal DIRECT_RESET 610, and every scannable flop's reset is controlled by the direct reset signal 610. As such, when the test mode signal 620 is asserted or "1", the IDDQ and internally generated reset are rendered useless. In some processors, such as GH100 of NVIDIA, a dedicated pin for this functionality has been created called DIRECT_RESET. In the illustrate example, the RESET macro 600 includes a combination of logic circuits 650 that have been constructed to perform the above described functions. It is understood that the combination of logic circuit that can be used for the RESET macro 600 is not limited to the one shown.

Figure 7:
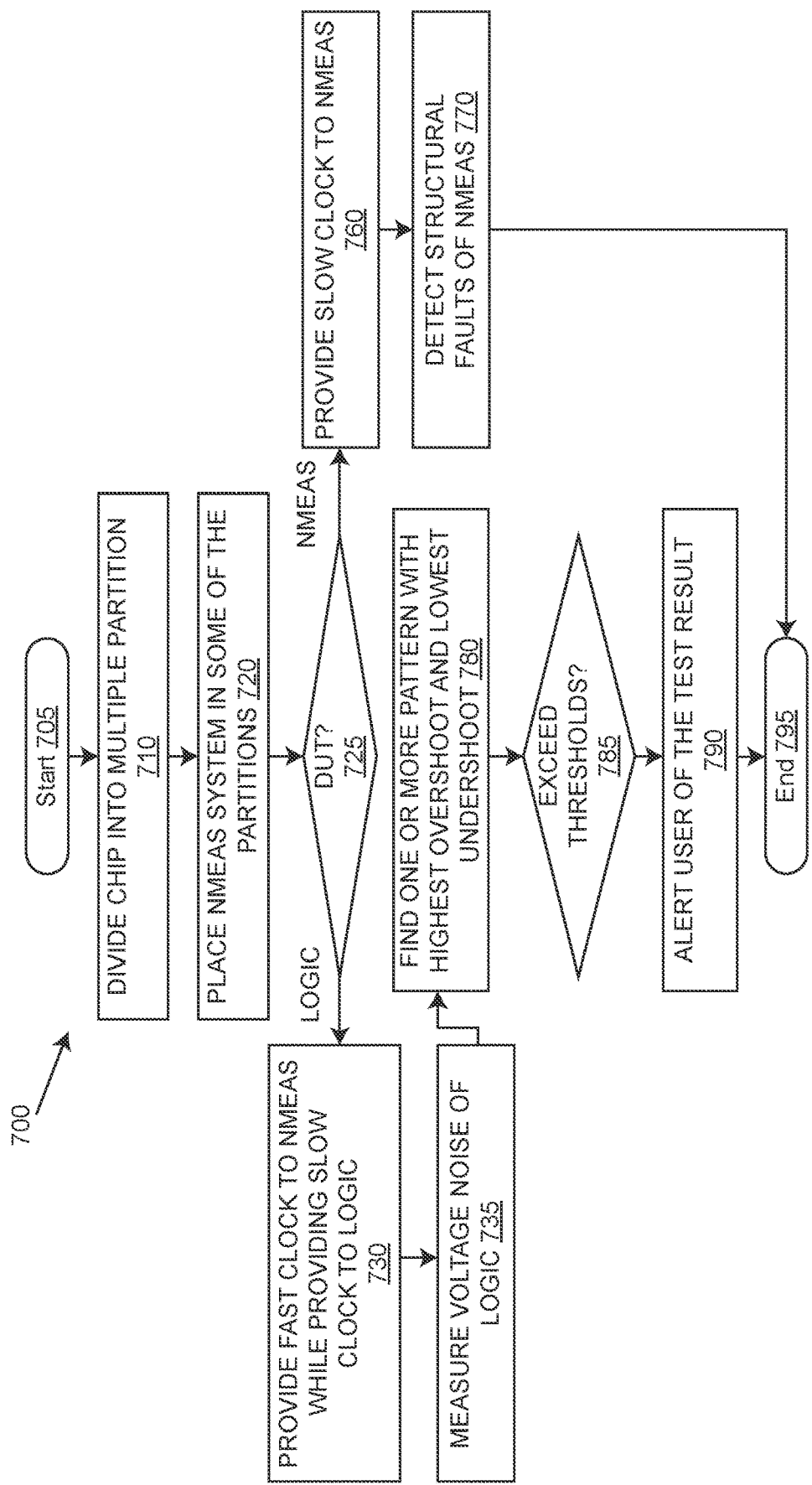
FIG. 7 illustrates a flow diagram of an embodiment of a method for performing a design for testing (DFT) scan test on logic and an NMEAS circuit of a chip.

FIG. 7 illustrates a flow diagram of an embodiment of a method for preparing and performing a design for testing (DFT) scan test on a chip. At least portion of the method 700 may be performed using a NMEAS system, such as 100 in FIG. 1, while the chip is being manufactured or after chip has been manufactured. The method 700 may be performed in a controlled environment as part of ATE testing or in the field (in an operating environment) as part of IST or runtime IST. The method 700 starts at step 705.

At step 710, the chip is divided into multiple partitions. More specifically, the chip is logically divided based on expected activity and noise of the chip at step 710. In one embodiment, the average area of partitions is around 1,000, 000 nm².

At step 720, partitions that are expected to be the most active and hence cause the most noise, such as partitions with a SM, are identified, and an NMEAS system, such as 100 in FIG. 1, is placed in the identified partitions. For other partitions, they may only include an NMEAS circuit. For example, while the NMEAS circuit is placed at every partition, other components of the NMEAS system, e.g., the clock circuit and the EGL, are only placed in SM partitions.

In the illustrated example, the NMEAS circuit is placed at a center of each selected partitions, where the maximum noise can be expected. It is understood that this is not always the case and the NMEAS circuit can be pushed toward the edges of the partition depending on other factors. The NMEAS circuit is designed to be a small form factor having an area of less than 1,000 nm². It is understood that steps 710-720 may be performed as part of a manufacturing method by a manufacturer.

At step 725, the method 700 determines the mode of the scan test. In other words, the method 700 determines a DUT, whether the scan test is performed on other logic in the partition (measurement mode) or the NMEAS circuit (self-testing mode) of the chip. If the method 700 determines that the scan test is performed on the NMEAS circuit, the method 700 moves to step 760.

If the method 700 determines that the scan test is performed on the other logic of the partition, the method 700 further determines the trim mode of the measurement mode. As discussed above, the trim mode can be a shift only where the voltage noise is measured only during shift phases, a capture only where the voltage noise is measured only during capture phases or a comprehensive mode where the noise is measured during both shift and capture phases. Once the trim mode is determined, the method 700 moves to step 730.

In a shift-only mode, the goal is to help identify the pattern (or patterns) that caused the highest voltage undershoot and overshoot. This would help determine if the Vmin is limited by shift or capture. Also, it would facilitate further debug and experimentation with other low-power shift stagger configurations.

In a capture-only mode, based on the NMEAS output for the noisiest patterns, the LPC (Low Power Capture) values could be tightened or relaxed or other solutions like capture stagger could also be applied. The Vmin needs to be low in order to be able to detect the 16-FF faults which manifest only at low voltage. While the above-stated modes of noise measurement are helpful for debug and characterization, it is the comprehensive noise measurement mode that is useful for deployment in real-time.

In any of the trim modes, the NMEAS registers are overwritten with a new value for noise undershoot, every time the macro encounters a new minimum in the pattern. The minima can occur during a shift or capture. Both the measurement value and the pattern in which the minima occurred are recorded. The same concept is also applied to the recoding of the voltage overshoot and every time a new maximum is encountered the measurement value and the corresponding pattern number are stored.

At step 730, a functional frequency clock is provided to the NMEAS circuit for operation. The functional clock is provided from a clock unit such as clock circuit 120 in FIG. 1 or 300 in FIG. 3, that is communicatively connected to the NMEAS circuit. As mentioned above, the functional frequency clock represents a clock signal, such as CLK_B, that is around 800-1600 MHz and within an operating frequency range of the NMEAS circuit. Also during step 730, a shift and capture frequency clock is provided to the other logic of the partition. The shift and capture frequency clock is provided from the same clock unit that is also communicatively connected to the other logic in the partition. As mentioned above, the shift and capture frequency clock represents a clock signal, such as CLK_A, that has, in addition to a capture frequency clock portion, a shift clock frequency portion that has a lower frequency than the capture frequency portion, e.g., around 50-70 MHz, and out of the operating frequency range of the NMEAS circuit.

At step 735, voltage noise of the other logic is measured. The voltage noise is measured while the NMEAS circuit is being provided with the functional frequency clock and the other logic in the partition is being provided with the shift and capture frequency clock. The NMEAS circuit sends the functional frequency clock as data through a programmable delay and captures the data at successive intervals to evaluate the number of "pass" and "fail." Using the find delay elements between the capture flops, the NMEAS circuit can determine not only a path has failed but also by how much. For the other logic, the shift frequency clock portion is supplied during shift phase, and the capture frequency clock portion is supplied during capture phase.

During step 735, the voltage noise values is recorded. The recording is enabled using an EGL, such as EGL 130 in FIG. 1 or EGL 400 in FIG. 4, that distinguishes between shift and capture phases and based on the distinction, asserts the control bit to enable the noise measurements in each phase based on the selected trim mode. For example, the control bit is asserted only during shift phases under a shift only trim mode, and the control bit is asserted across all patterns under a comprehensive trim mode.

The recorded values, e.g., new voltage undershoot and overshoot, are stored in NMEAS registers. Along with these values, the pattern numbers in which those values occurred is tracked using the NMEAS counter.

At step 780, the method 700 finds one or more patterns that recorded the highest overshoot and the lowest undershoot. Using the records of the register and the tracked pattern numbers of the counter, the method 700 performs step 785.

At step 785, the method 700 determines whether the highest voltage overshoot and the lowest voltage undershoot exceed corresponding thresholds. The highest voltage overshoot is compared to the predetermined maximum value, and the lowest undershoot is compared to the predetermined minimum value. The thresholds are predetermined before the method 700 starts using pre-silicon volume characterization.

At step 790, the user or tester of the chip is alerted of the scan test results, such as the result of step 785. Based on the test results, the user/test may take appropriate action. In one embodiment where the scan test was an ATE testing and the noise exceeded the thresholds, the tester may choose to update or modify the pattern or the logic or change the power settings of low power scan architectures based on the voltage noise characterization (steps 780 and 785). In another embodiment where the test was part of a runtime IST and the noise exceeded the thresholds, the user may stop operating the device with the chip immediately and replace the chip. The method 700 ends at step 795.

Referring back to step 725, the method 700 determines the scan test is performed on the NMEAS circuit of the chip. In such instance, the method 700 moves step 760. The self-test is enabled by a reset macro, such as 140 in FIG. 1 or 600 in FIG. 6. The reset macro controls a reset of the NMEAS circuit by asserting a direct reset bit while rendering the internally generated reset useless.

At step 760, a shift and capture frequency clock is provided to the NMEAS circuit. As mentioned above, the shift and capture frequency clock here refers to a mixture of shift and capture frequency clock portions, such as CLK_A, which may include shift frequency clock portion followed by the capture frequency clock portion for each scan testing pattern.

At step 770, structural faults of the NMEAS circuit are detected. The detection can be made during both shift and capture phase similar to the noise measurement step 735. Also similar to step 735, the measured values, such as the pattern number where the fault occurred can be recorded. Once the result is recorded, the method 700 ends at step 795.

It is understood that the chip being tested by the method 700 may be a processor, such as a GPU or a hardware accelerator, of a complex SoC for an advance driver-assistance system (ADAS), and at least a portion of the method 700, e.g., steps 725 and on, may be performed as key on/key off IST, e.g., before and after a vehicle has been driven, or runtime IST, e.g., while a vehicle is being driven. The chip being tested could also be part of other autonomous or semi-autonomous systems, such as a robotic system.

Figure 8:
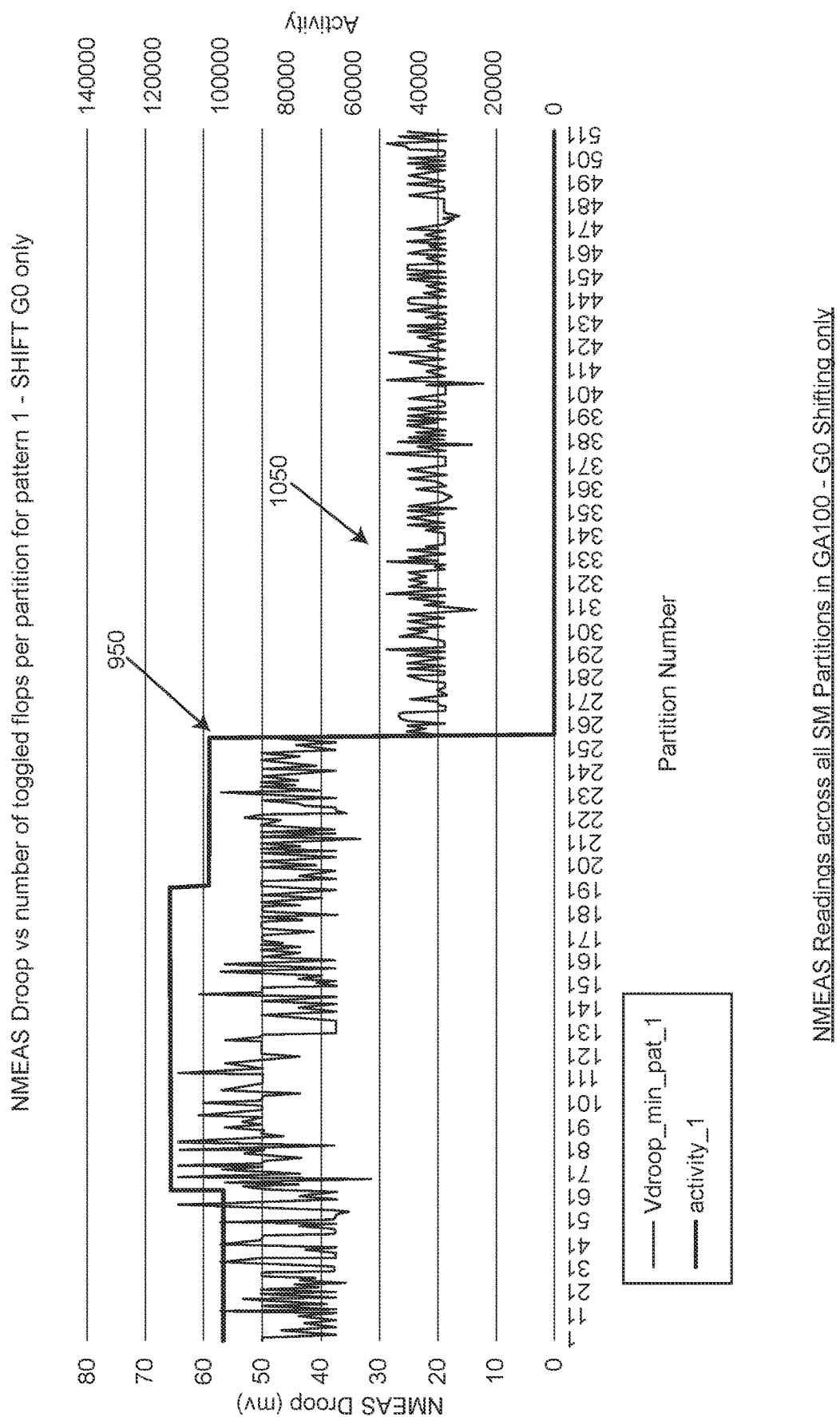
FIG. 8 illustrates NMEAS readings across G0 partitions in a graphics processing unit (GPU)—G0 shifting only.
Figure 9:
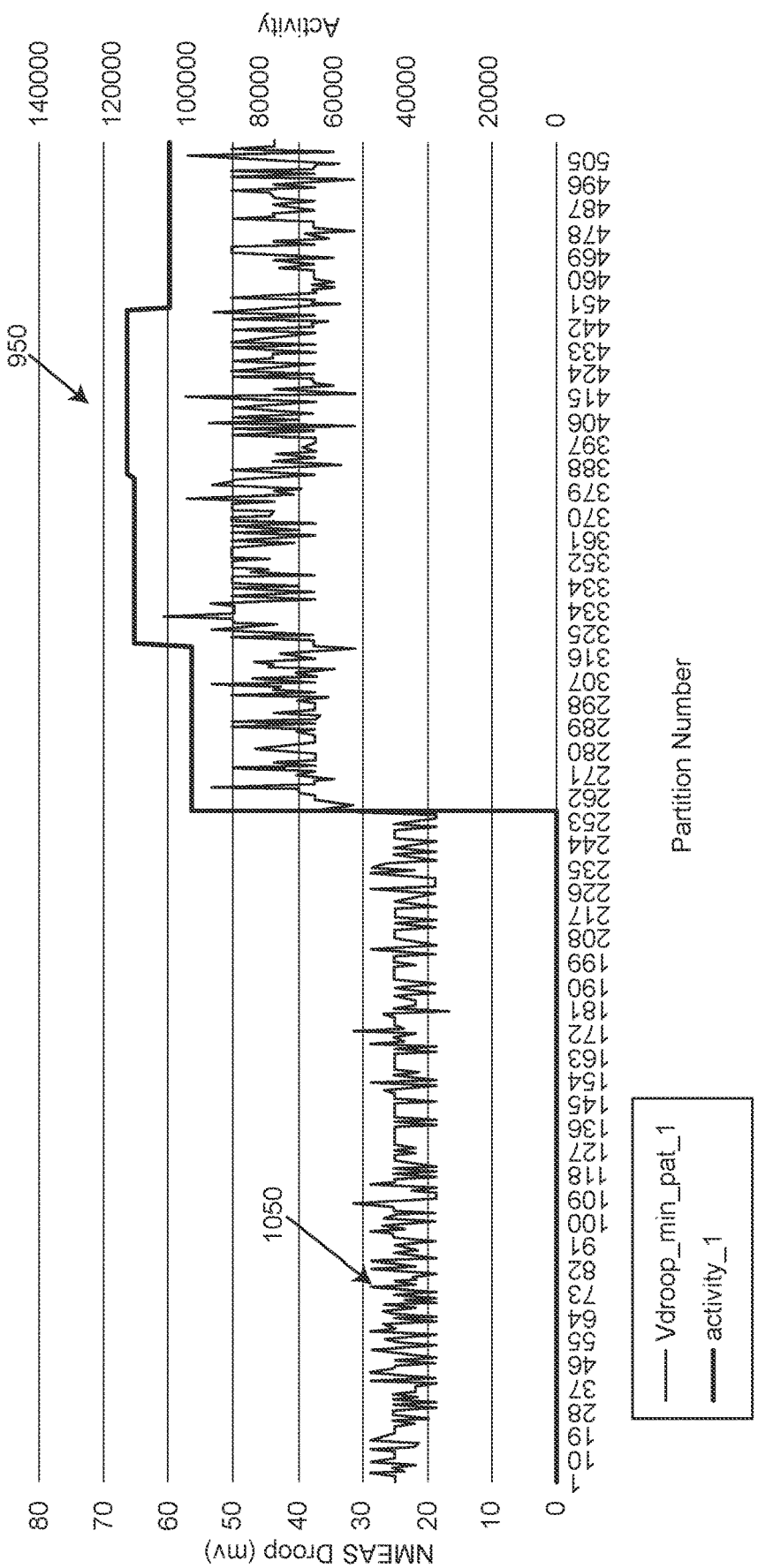
FIG. 9 illustrates NMEAS reading across G1 partitions in the GPU—G1 shifting only.
Figure 10:
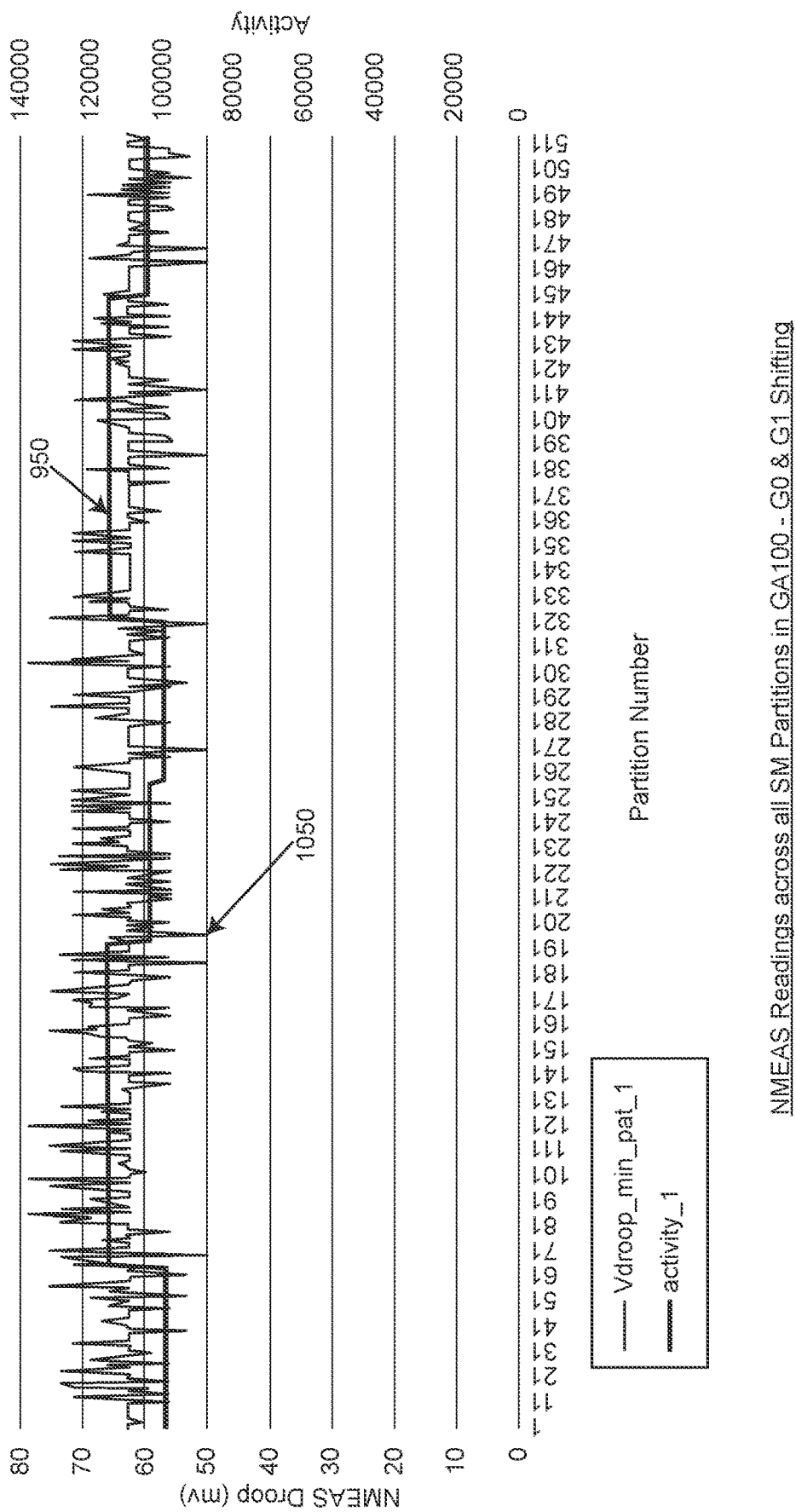
FIG. 10 illustrates NMEAS reading across all partitions in the GPU—G0 and G1 shifting.

FIGS. 8-10 illustrate the toggle rate 950 and voltage droop value 1050 measured by NMEAS circuit in every SM partition. The measurements were done using HVT trim at 1300 MHz during shift for three different patterns. Pattern 1 is a G0-only pattern in which G0 body pattern is loaded during test while G1 is clock gated (reducing dynamic power dissipation by removing clock signal when the circuit is not in use), and therefore, with no workload and zero toggle rate as seen in FIG. 8. Result shows voltage droop in G0 chiplets are much higher than the voltage droop in G1 chiplets.

In FIG. 9, Pattern 2 is a G1-only pattern, in which the G1 body pattern is loaded during test while G0 is clock gated, and therefore, with no workload and zero toggle rate as seen in FIG. 8. Unlike the result of Pattern 1, the measured voltage droop values in G1 chiplets are much higher than the voltage droop values in G0 chiplets.

Finally, the last pattern is a concurrent pattern in which G0 and G1 body patterns are loaded sequentially during test as seen in FIG. 10. In this case, the voltage droop in G0 and G1 chiplets are almost the same since the toggle rate in both G0 and G1 chiplets are the same. Results in FIG. 10 show a very high correlation between voltage droop in a partition and its corresponding toggle rate.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media or non-transitory computer-readable medium, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more processing units. The processing unit may include one or more GPUs, one or more CPUs, one or more hardware accelerators, e.g., a deep learning accelerator, a vision processing unit, and a tensor processing unit, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The processing units in the processors or computers, such as GPUs, can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the Summary may have one or more of the additional features of the dependent claims in combination. It is noted that as used herein and in the appended claims, the singular forms "a", "an", and "the" include plural referents unless the context clearly dictates otherwise.

What is claimed is:

1. A method for performing a scan test on a chip, the method comprising;
providing a first clock to a noise measurement (NMEAS) circuit of the chip while providing a second clock, which includes a portion that is slower than the first clock, to other logic of the chip during the scan test when the other logic is a device under test (DUT); and
measuring a voltage noise of the other logic using the NMEAS circuit during the scan test.

2. The method of claim 1, further comprising:
when the NMEAS circuit is a DUT, providing the second clock to the NMEAS circuit during the scan test, and detecting a structural defect of the NMEAS circuit during the scan test.

3. The method of claim 2, wherein the detecting includes controlling a reset of the NMEAS circuit by asserting a direct reset to the NMEAS circuit while bypassing an internally generated reset of the NMEAS circuit.

4. The method of claim 1, wherein the first clock is a functional frequency clock that is within an operating frequency range of the NMEAS circuit.

5. The method of claim 1, wherein the portion that is slower than the first clock is a shift clock portion.

6. The method of claim 1, wherein the providing the second clock includes clipping the second clock during a capture phase of the scan test.

7. The method of claim 1, further comprising determining whether the voltage noise exceeds a threshold.

8. The method of claim 7, wherein the threshold is defined using a pre-silicon volume characterization.

9. The method of claim 7, further comprising:
recording voltage noise values of patterns used in the scan test while keeping track of the patterns; and
finding one or more patterns that recorded the highest voltage overshoot and the lowest volage undershoot.

10. The method of claim 9, further comprising determining whether the highest voltage overshoot and the lowest voltage undershoot exceed corresponding thresholds.

11. The method of claim 9, further comprising changing power settings of low power scan architectures in the chip based on the lowest voltage undershoot.

12. The method of claim 10, wherein the thresholds include a minimum value for the lowest voltage undershoot and a maximum value for the highest voltage overshoot.

13. The method of claim 11, further comprising alerting a user of the chip when the highest overshoot exceeds the maximum value.

14. The method of claim 1, wherein
the chip is partitioned into multiple partitions and
the NMEAS circuit is located in one of the partitions that is expected to cause noises that are higher than thresholds.

15. The method of claim 14, wherein the NMEAS circuit is located at a center of the one of the partitions.

16. The method of claim 1, wherein the other logic and the NMEAS circuit are located in a same partition.

17. The method of claim 1, wherein the scan test is performed while the chip is being manufactured using automatic test equipment (ATE).

18. The method of claim 1, wherein the scan test is initiated before and after the chip is used in an operating environment using an in-system test (IST) controller.

19. A noise measurement (NMEAS) system for performing a scan test on a chip comprising:
an NMEAS circuit of the chip configured to measure a voltage noise of other logic of the chip during the scan test; and
a clock unit configured to provide a first clock to the NMEAS circuit while providing a second clock, which includes a portion that is slower than the first clock, to the other logic during the scan test when the other logic is a device under test (DUT).

20. The system of claim 19, wherein, the clock unit is configured to provide the second clock to the NMEAS circuit during the scan test when the NMEAS circuit is a DUT, and the NMEAS circuit is configured to detect a structural defect of the NMEAS circuit during the scan test.

21. The system of claim 20, further comprising a reset macro, wherein the structural defect of the NMEAS circuit is detected while an internally generated reset of the reset macro is bypassed for a direct reset.

22. The system of claim 19, wherein the first clock is a functional clock frequency that is within an operating frequency range of the NMEAS circuit.

23. The system of claim 19, wherein the portion that is slower than the first clock is a shift clock portion.

24. The system of claim 19, further comprising an enable generation logic (EGL) configured to enable recording of a voltage noise value based on a phase of the scan test.

25. The system of claim 19, wherein the NMEAS circuit is further configured to determine whether the voltage noise exceeds a threshold.

26. The system of claim 25, wherein the threshold is defined using a pre-silicon volume characterization.

27. The system of claim 25, further comprising:
a register configured to record voltage noise values of patterns used in the scan test; and
a counter configured to keep track of the patterns.

28. The system of claim 27, wherein the NMEAS circuit finds, using the register and the counter, one or more of the patterns that recorded the highest voltage overshoot and the lowest volage undershoot.

29. The system of claim 28, wherein the NMEAS circuit determines whether the highest voltage overshoot and the lowest voltage undershoot exceed corresponding thresholds.

30. The system of claim 28, wherein power settings of low power scan architectures in the chip are changed based on the lowest voltage undershoot.

31. The system of claim 29, wherein the thresholds include a minimum value for the lowest voltage undershoot and a maximum value for the highest voltage overshoot.

32. The system of claim 30, wherein a user of the chip is alerted that the chip needs to be replaced when the highest overshoot exceeds the maximum value.

33. The system of claim 19, wherein the chip is partitioned into multiple partitions, and the NMEAS circuit and the clock unit are located in some of the partitions that are expected to cause noises that are higher than thresholds.

34. The system of claim 33, wherein the NMEAS circuit is placed at a center of a corresponding partition.

35. The system of claim 19, wherein the other logic and the NMEAS circuit are located in a same partition.

36. The system of claim 19, wherein the scan test is performed while the chip is being manufactured.

37. The system of claim 19, wherein the scan test is performed before and after the chip is used in an operating environment.

38. The system of claim 19, wherein the scan test is performed while the other logic is being used in an operating environment.

39. A chip having the NMEAS system as recited in claim 19, and the other logic.

40. A vehicle control system comprising:
a noise measurement (NMEAS) system configured to perform a scan test on a chip of a vehicle, wherein the NMEAS system includes:
an NMEAS circuit configured to measure a voltage noise of other logic of the chip during the scan test; and
a clock unit configured to provide a first clock to the NMEAS circuit while providing a second clock, which includes a portion that is slower than the first clock, to the other logic during the scan test when the other logic is a device under test (DUT).

41. The system of claim 40, wherein the clock unit is configured to provide the second clock to the NMEAS circuit during the scan test when the NMEAS circuit is a DUT, and the NMEAS circuit is configured to detect a structural defect of the NMEAS circuit during the scan test.

42. The system of claim 40, wherein the scan test is performed while the chip is being manufactured.

43. The system of claim 40, wherein the scan test is performed as key on/key off in-system test before and after the vehicle is used.

44. The system of claim 40, wherein the scan test is performed while the vehicle is being driven.

45. The system of claim 40, wherein the vehicle control system is at least one of: an autonomous vehicle control system, a semi-autonomous vehicle control system, a technology assisted vehicle control system, or an advanced driver-assistance system.

* * * * *